Aug. 10, 1937.                    F. L. LINDSTROM                    2,089,275
                                  PICTURE PROJECTOR
                          Filed Dec. 29, 1934              2 Sheets-Sheet 2

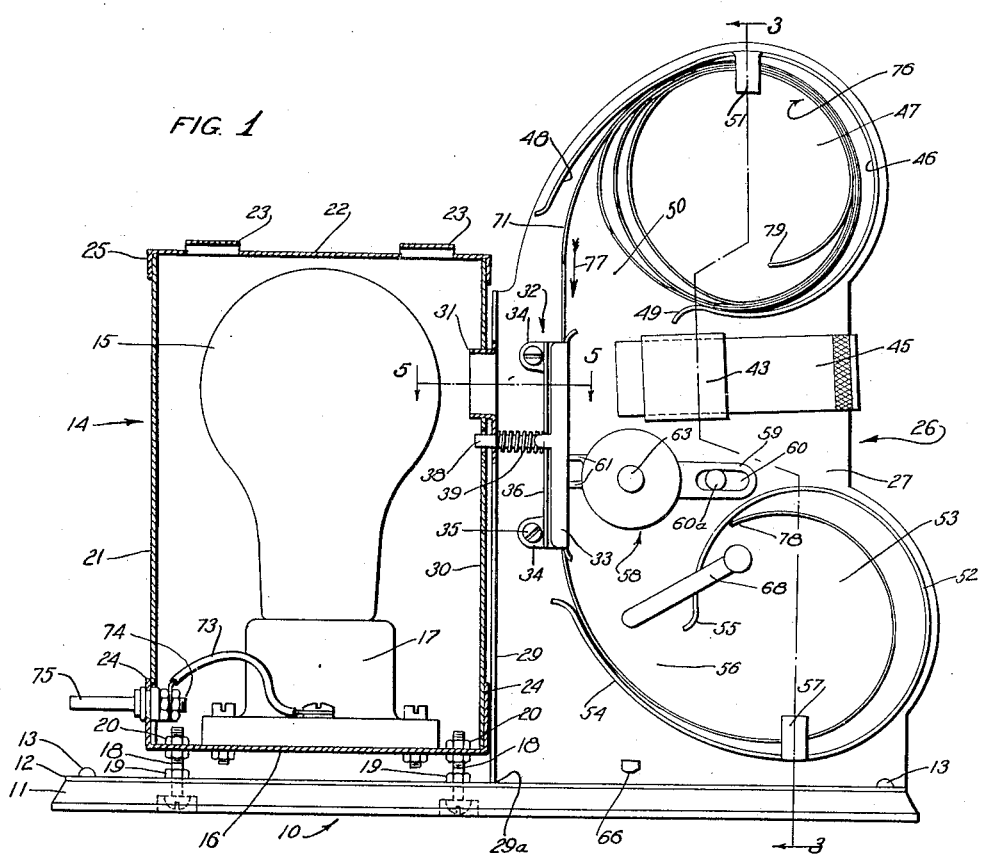

INVENTOR.
FRANK L. LINDSTROM.
BY John Hanrahan
ATTORNEY.

Patented Aug. 10, 1937

2,089,275

UNITED STATES PATENT OFFICE 2,089,275

PICTURE PROJECTOR

Frank L. Lindstrom, Bridgeport, Conn.

Application December 29, 1934, Serial No. 759,745

3 Claims. (Cl. 88—17)

This invention relates to new and useful improvements in motion picture projectors and has particular relation to a projector especially adapted for home use.

The invention provides a projector including a minimum number of parts and which may therefore be manufactured at low cost.

Further, the invention comprehends a projector so constructed that by the same means a roll of film may be fed through the machine in either direction and rolled or coiled as it is fed.

The invention also includes certain features of construction as will be pointed out in the following specification.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a view partly in side elevation and partly in section showing a complete machine constructed according to the present invention;

Fig. 2 is a top plan view of the machine of Fig. 1;

Figure 3:
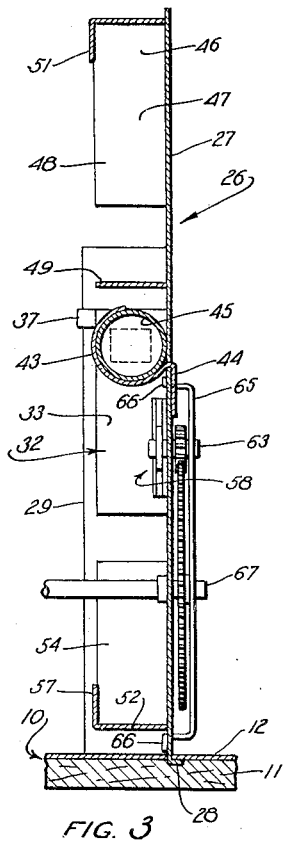
Fig. 3 is a sectional view taken substantially along the plane of the line 3—3 of Fig. 1, the housing for the light source being omitted.

Referring in detail to the drawings the improved machine includes a base 10 which may comprise a wooden base member 11 to the upper surface of which is secured a sheet metal plate 12, the latter being held in place as by tacks or other securing means 13. On the rear portion of the base 10 there is mounted a housing 14 for a light source 15. Housing 14 includes a lower end member 16 carrying a socket 17 for the bulb 15. This lower end is held in place by bolts 18 passing through the base and having nuts 19 and 20 at the lower and upper sides of the member whereby it may be held in various positions of adjustment as will later be more clear. Supported by the lower end member 16 is a hollow body member 21 substantially rectangular in section and extending upwardly about the bulb 15 and at its upper end closed by an upper end member 22 which may have ventilating slots 23 therein as shown. It will be noted that the lower end member 16 includes side flanges 24 receiving and embracing the lower end portion of the body member 21 and that the upper end member includes similar sides or flanges 25 receiving and embracing the upper end portion of the body 21.

On the forward portion of the base 10 there is mounted a supporting member 26 comprising a section of sheet metal including a vertically extending portion 27 arranged edgewise with respect to the housing 14. The member 26 may be mounted on the base or secured to the base as by means of lugs 28 (see Fig. 3) on the lower edge of the portion 27 of the member being passed through openings in the upper or sheet metal plate 12 of the base and then clinched over at the under side of said plate.

The rear edge of the portion 27 of the supporting member is bent to provide a flange 29 extending at right angles to the supporting portion of the member and parallel with the front wall 30 of the light housing. Flange 29 is provided with a tubular extension 31 extending through a suitably arranged opening in the front wall of the light housing and providing a conduit for light from the interior of the housing 14 to the forward side of the flange. With this construction the body 21 of the light housing is held in the lower end member 16 and since the lower edge of the flange 29 engages the base plate 12 at 29a such flange provides a lateral brace for the portion 27 of the supporting member 26.

Figure 5:
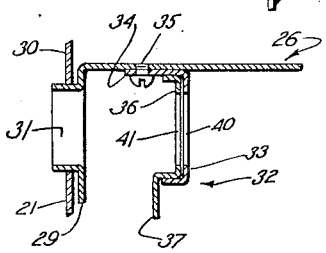
Fig. 5 is a sectional view taken substantially along the line 5—5 of Fig. 1.
Figure 6:
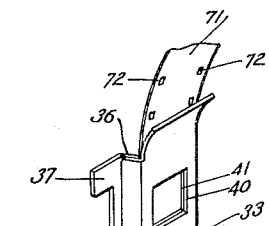
Fig. 6 is a perspective view of the film guiding means.
Figure 7:
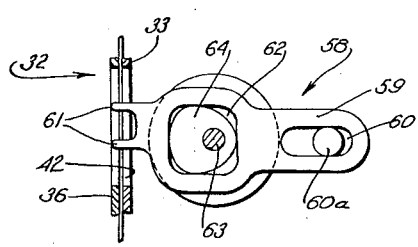
Fig. 7 is a side elevational view showing the film feeding means.
Figure 8:
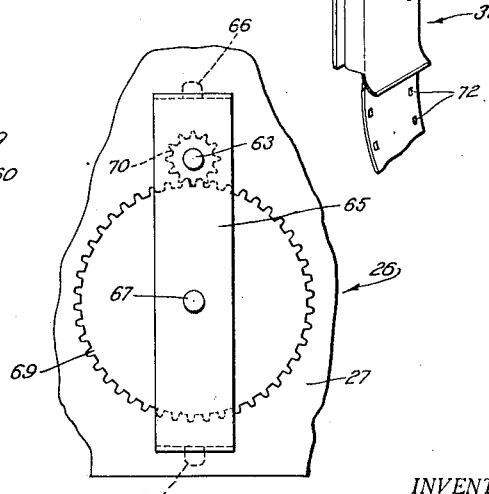
Fig. 8 is an elevational view showing the gearing between a hand crank or other drive and the cam of the film feeding means.

On the vertical portion 27 of the supporting member 26 and forwardly of the flange 29 there is mounted a film guiding means generally designated 32 and comprising an outer elongated part 33 substantially U-shaped in transverse section as shown best in Fig. 5 and which part has one arm 34 disposed against the portion 27 of the supporting member and secured thereto as by bolts or rivets 35. The guide means 32 includes an inner elongated part 36 also substantially U-shaped in transverse section and of a size to nest within the part 33 and the part 36 along its outer edge may be provided with a finger lug 37 for a purpose later to be described. A stud 38 is carried by the part 36 of the guide means and extends rearwardly from said part and is slidable through aligned openings in the flange 29 and in the front wall 30 of the light housing 14 as shown best in Fig. 1. A coil spring 39 is disposed about the stud 38 and at one end bears against the flange 29 and at its other end bears against the part 36 of the guide means and normally urges the part 36 into the part 33.

It should now be understood that the part 33 of the guide means is held stationary by the bolts or rivets 35 and that the part 36 is normally urged into the part 33 by the coil spring 39 and it will be apparent that by pressing rearwardly on the lug 37 the part 36 may be pushed rearwardly or out of the part 33. From Fig. 5 it will be clear that the side walls or arms of the part 36 slide against the inner surfaces of the side walls or arms of the part 33 so that the part 36 has no movement relative to the part 33 except a movement into and out of said part as the coil spring 39 expands or as the part 36 is forced outwardly against the action of said spring. The parts 33 and 36 have registering apertures 40 and 41 adjacent their upper ends and below the aperture 40 and toward one of its longitudinal edges the part 33 is provided with a longitudinally extending slot 42 the purpose of which will later be fully explained.

When the apparatus is in use a film is fed between and guided by the parts 33 and 36 of the means 32 and the apertures 40 and 41 of said parts in addition to registering with one another are in alignment with the tubular extension 31 of the flange 29. Therefore, light from the bulb 15 passing through the tubular extension 31 also passes through the registering openings 40 and 41 in the parts 33 and 36 and will pass through a film being fed between such parts. On the vertical portion 27 of the supporting member 26 there is arranged a spring clip 43 secured in place as by means of a part 44 passed through the portion 27 and turned over or clinched as shown in Fig. 3. This clip receives and mounts a tubular member 45 within which is mounted suitable lenses (not shown). It will be apparent that the member 45 is clamped against the vertical portion 27 of the supporting member by the clip 43 and that such tubular member may be moved longitudinally through the clip 43 to properly focus on a screen or wall or the like.

A strip 46 of sheet metal has one of its edges secured against a side of the upper part of the vertical portion 27 of the supporting member 26 and such strip 46 is bent into a somewhat circular form and with the said upper part of the portion 27 forms a film receiving compartment 47 the inner surface of which is curved and is substantially circular. One end portion 48 of the strip 46 extends over or across the upper end of the film guiding means 32 to form a lead and the other end portion 49 of said strip is spaced from the end portion 48 whereby there is an opening 50 left between the end portions of the strip and providing for the feeding of a film out of or into the compartment 47 as will later more fully appear. If desired, an overhanging finger-like member or lug 51 may be provided at the free edge of the strip 46 and at the upper side of the compartment to prevent a coil of film moving laterally out of the compartment as will later be described.

A sheet metal strip 52 has one of its edges secured against a side of the lower part of the vertical portion 27 of the member 26 and such strip 52 is longitudinally curved as shown in Fig. 1 and with the said lower part of the portion 27 forms a film receiving compartment 53 the inner edge surface of which is curved and is substantially circular. One end portion 54 of the strip 52 forms a lead extending across or under the lower end of the film guiding means 32 and the other end portion 55 of the strip is spaced from the end portion 54 whereby an opening 56 is left between the end portions of a strip and provides for the feeding of a film into or out of the compartment 53 as will later be described. Obviously, the lower part of the vertical member 27 closes one side of the compartment 53 and a lug or finger-like member 57 is provided at the free edge of the strip 52 at the lower side of the compartment 53 and serves to prevent a coil of film moving laterally out of the compartment. By reference to Fig. 3 it will be noted that the compartments 47 and 53 are relatively shallow being of a depth substantially equal to the width of a film to be used.

Means are provided for feeding a film from one of the compartments to the other through the guide means 32 and by the registering apertures 40 and 41 in the parts of said guide means. The film feeding means generally designated 58 includes a member 59 provided in one end portion with a slot 60 through which extends a pin 60a carried by the supporting member 26. At its other end the member 59 is forked or provided with a pair of prongs or fingers 61 and in its intermediate portion the member is provided with an opening or slot 62. A shaft 63 extends through the opening 62 and within said opening is provided with a cam 64 and this shaft is journaled in the vertical portion 27 of the supporting member and in a bracket 65 secured thereto. This bracket is at the side of the member 26 opposite that at which the compartments 47 and 53 are formed and is secured to the supporting member as by having the lugs 66 pass through such member and then turned over as shown in Fig. 3.

A shaft 67 is also journaled in the vertical portion of a supporting member 26 and in the bracket 65 and such shaft has its outer end portion bent to provide a crank 68 by means of which the shaft may be manually rotated. On the shaft 67 between the vertical plate 27 and the bracket 65 is a relatively large gear 69 meshing with a small gear 70 secured to the short shaft 63 and also located between the vertical plate 26 and the bracket 65. From this it will be understood that as the shaft 67 is rotated by the crank 68 the gear 69 will be rotated and since such gear meshes with the gear 70 and the latter is tight with the shaft 63 such shaft and the cam 64 will be rotated. The member 59 is mounted for a sliding movement toward and from the guiding means 32 and such member also has a certain limited vertical movement imparted to it by the cam 64 as the latter is turned and the member has its prongs or fingers 61 located to enter the slot 42 in the front face of the part 33 of the guiding means.

Slot 42 is so located that as a film 71 is passing through the guiding means 32 the usual perforations 72 along one edge of the film will be exposed through such slot. The fingers or prongs 61 of the member 59 are spaced apart the same distance as a pair of the perforations 72 and as the crank 68 is rotated in one direction the forward or pronged end of the member 59 is raised slightly and then the member is moved forwardly to carry its prongs 61 inwardly through the slot 42 in the guide means and into a pair of the perforations 72 in the edge of the film. Continued movement of the crank in the same direction next results in the pronged end of the member 59 being moved vertically downwardly a distance equal to the distance between a pair of the perforations 72. As rotation of the crank continues the member 59 is next shifted outwardly with respect to the guide means 32 or toward the right in Fig. 1 so as to draw the prongs 61 out of the perforations in the edge of the film and as the crank continues its movement the member 59 is advanced toward the film to enter the next uppermost pair of perforations and again feed the film forwardly. The described action is repeated until the film has been fed its entire length.

In the initial threading of the film through the guide means should the perforations 32 of the film not be correctly positioned to have the prongs or fingers 61 enter them then the prongs will push against and force the film rearwardly against the part 36 of the guide means and since such part is only yieldingly held in place by the coil spring 39 the part will be forced rearwardly against the action of said spring and the film will not be punctured.

Should the crank be turned in the direction opposite to that above described then the member 59 will be shifted inwardly or in a direction to carry its prongs 61 through the lower portion of the slot 42 and into a pair of the perforations 72 in the film and then the pronged end of the member will be moved vertically upwardly to shift the film upwardly a distance equal to the distance between a pair of the perforations after which the member 59 will be shifted outwardly or toward the right in Fig. 1 and then moved downwardly and inwardly and upwardly to again advance the film. It will, therefore, be seen that by rotating the crank 68 in one direction or the other the film may be fed downwardly or upwardly through the guiding means 32.

The socket 17 may be of any of the usual construction and is bolted or otherwise secured to the lower or bottom end member 16 of the housing 14 and by means of suitable leads 73 is connected with binding posts 74 having terminals 75 extending to the outer side of the housing to be received in any suitable plug as will be understood.

Printed films 11 are of various lengths, depending upon the price, and are now sold in coils as shown at 76 in Fig. 1 and to use the present projector, assuming that the terminals 75 are connected with a source of current and that the bulb 15 is energized, it is but necessary to insert the coil 76 into the compartment 47 and to thread the front end of the film through the guide means 32 and to then operate the crank 68 to feed the film downwardly through such guide means. The coil 76 is placed in the compartment 47 by moving the coil laterally through the open side of the compartment it being only necessary to tilt the coil to get it under the lug 51.

In the compartment the coil is released and the front end of the film is then threaded downwardly through the guide means 72 by passing the film between the parts 33 and 36 of said means. To facilitate passing the end of the film into the guide means the lug 37 may be pressed rearwardly to open the guide means or to move the guide means part 36 rearwardly with respect to the part 33. The crank 68 is given some little movement while the end of the film is shifted by the fingers of the operator until the film is properly positioned to have the prongs or fingers 61 of the part 59 of the feeding means enter a pair of the perforations 72 in the film. When this is accomplished continued rotary movement of the crank 68 will result in the film being fed downwardly as indicated by the arrow 77 in Fig. 1 and the lower or forward end of the film will enter the lower compartment 53 through the opening 56 between the end portions 54 and 55 of the strip 52.

As before pointed out, the end portion 54 forms a lead and the end of the film may enter the compartment 53 through the opening 56 either with or without being guided by the lead 54. That is, if the film is coiled to a certain tightness its end portion passes through the opening 56 without engaging the lead 54. As the film continues to be fed its front end 78 moves upwardly in the compartment 53 into engagement with the inner surface of the upper wall thereof and then, the feeding movement continuing, the film continues to enter the compartment until it is lying along the inner surface of the strip 52 for substantially the entire length of the latter. As the film continues to be fed the front end of the film is pushed along and moves in a spiral, guided by the inner surface of the strip 52 until the entire length of film has been fed.

When this occurs the front or lead end 78 of the film will be at the center of a coil within the compartment 53 and the tail end 79 of the film will be in the guide means 32. To recoil the film into its original condition it is then but necessary to reverse the direction of rotation of the crank 68. This will result in the film being fed upwardly through the guide means 32 and the tail end of the film will move back into the compartment 47, the initial movement carrying this end of the film into the compartment somewhat in the position of Fig. 4 but depending, of course, on the extent to which the film has been coiled.

Figure 4:
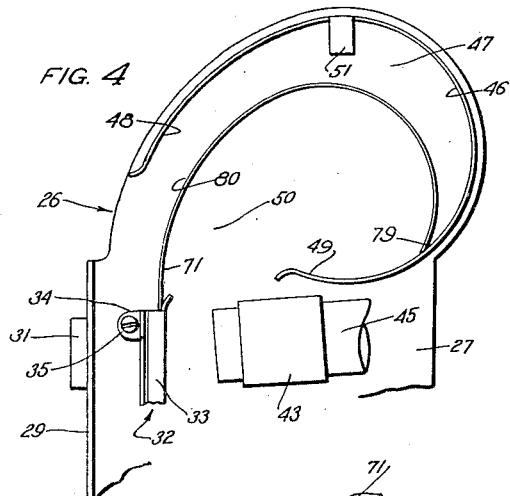
Fig. 4 is a side elevational view showing particularly the manner in which the film enters the upper compartment when the film is being rewound.

As the tail end of the film is fed back into the compartment 47 the film bends and tends toward the coil form in which it is sold and its tail end 79 falls against the lower wall of the compartment 47 or against the end portion 49 of the strip 46 as in Fig. 4. Continued feeding of the film into the compartment causes portion 80 of the film to move somewhat vertically until it is against the inner surface of the upper portion of the strip 46 and then the tail end portion 79 of the film is pushed along as the film continues to be fed and the film coils itself with the portion 79 at the inner end of the coil. When this recoiling operation has been completed the film may be returned to its box or other container in its original condition and with its forward or front end outermost ready to be again passed through the projector.

Attention is particularly directed to the fact that with the present arrangement it is not necessary to provide any spools or reels on which to wind or from which to unwind a film. Additionally no guiding sprockets are used. It will be apparent that the parts mentioned being omitted it is not necessary to provide gears or other means for driving such parts and thus cost of manufacture is greatly reduced. By the single crank 68 the film is fed in either direction and so it will be understood that when the film is being projected the operator may hold the same still in order that a particular scene may be retained on the screen or he may reverse the direction of rotation of the crank to bring back onto the screen any particular scene which it is desired to view at length. To focus the projector on a screen it is but necessary to shift the tube 45, containing the lens system, in one direction or the other through the clip 43.

The material of the films is sufficiently stiff so that as the film is being fed its foremost end, after leaving the feeding means, is pushed along and being guided by the edge walls of one or the other of the compartments, is caused to move in a spiral path whereby the film on leaving the feeding means is coiled. While in the compartments the film is protected and being caused to coil on itself as it enters each compartment it is prepared for removal or for being fed back into the other compartment and has no chance to become tangled or broken. The finger-like members or lugs 51 and 57 of the respective compartments prevent the coil of film moving laterally out of the compartments. The film is fed from the compartment 47 through the opening 50 in the edge wall thereof and enters the compartment 53 through the opening 56 in the edge wall thereof. On reversal of the direction of movement of the crank the film leaves compartment 53 through the opening 56 and enters compartment 47 through the opening 50.

Having thus set forth the nature of my invention, what I claim is:

1. In a motion picture projector, an elongated base, a lamp box secured to the rear portion of the base and extending upwardly therefrom, a frame member comprising a plate secured to the forward portion of the base and extending upwardly therefrom, a flange on the rear edge of said plate and extending across the front wall of the lamp box and secured thereto whereby to brace the upper portion of the plate from the lamp box, a film guide comprising a channel member having one arm secured to a side of the plate, a channel member entering the first channel member, a stud on the second channel member and extending freely through an opening in said flange, a spring about said stud and bearing at its respective ends against the flange and second channel member whereby the latter is urged into the first channel member, means for feeding film through said guide, and means on said plate for receiving film to be fed.

2. In a motion picture projector, an elongated base, a lamp box secured to the rear portion of the base and extending upwardly therefrom, a frame comprising a plate secured to the forward portion of the base and extending upwardly therefrom, a flange on the rear edge of said plate and extending across the front wall of the lamp box and secured thereto whereby to brace the plate from the lamp box, film feeding means on said plate and including a film engaging means at the forward side thereof, a bracket at the rear of the plate and including an intermediate portion spaced from the plate and having its ends secured to the plate, a pair of spaced shafts extending through the plate and the intermediate portion of the bracket and of which one is a driving shaft, intermeshing gears on the portions of the shafts between the plate and bracket whereby the driving shaft may transmit motion to the other of the pair of shafts, said film engaging means on and driven by said other shaft, and means on the forward side of the plate for receiving a film to be fed.

3. In a motion picture projector, a base, a metal member supported on and extending upwardly from said base, first and second vertically spaced film compartments on said member, each of said compartments formed of a curved strip of metal having one edge secured against said member whereby the compartments are open sided, a vertically disposed film guide on the member between the compartments, means on said member for feeding a film through said guide, said lower compartment having its bottom wall extending under the lower end of the guide to catch and direct a film being fed downwardly through the guide into the compartment, the top wall of said lower compartment having its end portion curving sharply downwardly forwardly of the guide to turn the lead end of a film being fed into the compartment, the top wall of the upper compartment extending over the upper end of the guide to catch and direct into the upper compartment a film being fed upwardly through the guide, the bottom wall of the upper compartment having its end disposed below and forwardly of the end of the top wall thereof and forwardly of the upper end of the guide, a short finger extending downwardly from the outer edge of the top wall of the upper compartment to prevent a film moving laterally out of the same, and a short finger extending upwardly from the outer edge of the bottom wall of the lower compartment to prevent the film moving laterally out of the same.

FRANK L. LINDSTROM.